United States Patent
Fialko (10) Patent No.: US 10,970,737 B2
(45) Date of Patent: Apr. 6, 2021

(54) SYSTEM AND PROCESS FOR AUTOMATICALLY GENERATING REWARDS WITH TICKET SALES

(71) Applicant: VET FEST LLC, La Jolla, CA (US)

(72) Inventor: Kevin Fialko, La Jolla, CA (US)

(73) Assignee: VET FEST LLC, La Jolla, CA (US)

( * ) Notice: Subject to any disclaimer, the term of this patent is extended or adjusted under 35 U.S.C. 154(b) by 153 days.

(21) Appl. No.: 15/632,229

(22) Filed: Jun. 23, 2017

(65) Prior Publication Data
US 2017/0372344 A1    Dec. 28, 2017

Related U.S. Application Data

(60) Provisional application No. 62/354,441, filed on Jun. 24, 2016.

(51) Int. Cl.
*G06Q 30/02* (2012.01)

(52) U.S. Cl.
CPC ..... *G06Q 30/0238* (2013.01); *G06Q 30/0236* (2013.01)

(58) Field of Classification Search
None
See application file for complete search history.

(56) References Cited

U.S. PATENT DOCUMENTS

| | | | | |
|---|---|---|---|---|
| 2002/0004762 A1* | 1/2002 | Izumoto | ................. | G06Q 10/02 705/5 |
| 2003/0171960 A1* | 9/2003 | Skinner | ................. | G07B 15/00 705/5 |
| 2006/0095344 A1* | 5/2006 | Nakfoor | ................. | G06Q 10/02 705/26.1 |
| 2010/0088128 A1* | 4/2010 | Henshaw | ............... | G06Q 10/02 705/5 |
| 2013/0247159 A1* | 9/2013 | Hall | ........................ | G06F 21/31 726/6 |

(Continued)

OTHER PUBLICATIONS

Veteran Tickets Foundation website (https://www.vettix.org/—See attached screenshots that were captured on or before Mar. 14, 2015) (hereinafter "Vet-Tix").*

(Continued)

*Primary Examiner* — James M Detweiler
(74) *Attorney, Agent, or Firm* — JCIP; Joseph G. Chu; Jeremy I. Maynard (57) ABSTRACT

A system and methods for automatically generating rewards with ticket sales is disclosed. The system directs a consumer to a ticket vendor portal where the consumer can place an order for the number of tickets desired. After the payment is confirmed, at the conclusion of the purchase, the rewards associated with the purchase of the tickets are automatically generated and returned to the consumer. The rewards may comprise free or reduced-price tickets for military service members or veterans, as well as for public servants such as members of the police and fire department for example. Civilians or a non-military member can direct rewards for a military member or veteran which is automatically generated by the system. Consumer devices may employ communication systems including cellular, Wi-Fi, Bluetooth, RFID, and Geo tracking for tracking consumer activity such as consumer purchasing and redemption of rewards.

10 Claims, 4 Drawing Sheets

(56) References Cited

U.S. PATENT DOCUMENTS

2016/0148122 A1* 5/2016 Paleja ................ G06F 3/04842
705/5

OTHER PUBLICATIONS

Veteran Tickets Foundation website (https://www.vettix.org/—See attached screenshots that were captured on or before Mar. 14, 2015) (hereinafter "Vet-Tix") (Year: 2015).*

* cited by examiner

SYSTEM AND PROCESS FOR AUTOMATICALLY GENERATING REWARDS WITH TICKET SALES

RELATED APPLICATION INFORMATION

The present application claims priority under 35 U.S.C. Section 119(e) to U.S. Provisional Patent Application Ser. No. 62/354,441 filed Jun. 24, 2016 entitled "SYSTEM AND PROCESS FOR AUTOMATICALLY GENERATING REWARDS WITH TICKET SALES" the disclosure of which is incorporated herein by reference in its entirety.

BACKGROUND OF THE INVENTION

1. Field of the Invention

This invention relates in general to ticketing systems and methods. More particularly, the invention is directed to a system and process for automatically generating rewards with ticket sales for special events, such as at music concerts and live performances, and identifying the rewards recipients at the special events.

2. Description of the Related Art

Every year, tens of thousands of people attend special events such as music concerts and live performances. In order to purchase the tickets to the special events, the event attendees would usually visit a website where the tickets for the events are sold and make the purchase online using credit cards. After the tickets are purchased, the event attendees may receive an electronic confirmation of the purchase, such as via email, and may have the option of printing the tickets at home or picking up the tickets at the roll call windows at the venues where the special events are held. Alternatively, the event attendees may also place an order for the tickets via special events ticketing agencies. After payment is received by the ticketing agencies, the tickets would either be sent to the attendees' mailing addresses or picked up at the roll call windows at the venues where the special events are held. In yet another alternative method, the event attendees may purchase the tickets at the venue.

During the special events, promotional offers, rewards, or opportunities to make donations to charities are sometimes presented to the event attendees. For example, in a live performance concert held to honor military veterans, military veterans and active duty members may receive a special reward in the form of free entrance to the special event. However, many conventional systems may not provide a convenient means for generating rewards when purchasing tickets for events.

Accordingly, there exists a need for providing a convenient, automatic means for generating rewards when purchasing tickets.

SUMMARY OF THE INVENTION

In the first aspect, a machine implemented method for generating rewards with ticket sales is disclosed. The method comprises receiving by a remote server, a request for a ticket and an identification of a consumer sent via a consumer computing device, processing the request for the ticket to generate an electronic ticket, and determining if the identification of the consumer matches the criteria for offering a reward by the remote server. The method further comprises determining the value of the reward, and transmitting by the remote server to the consumer computing device, the electronic ticket and reward.

In a first preferred embodiment, the method further comprises determining whether the identification of the consumer indicates that the consumer is associated with the military, and generating a reward for the consumer associated with the military. The method preferably further comprises determining whether the identification of the consumer indicates that the consumer is associated with one or more of the following: military members, veterans, police members, fire department members, or other public servants, and generating a reward for the consumer. The method preferably further comprises receiving by the remote server, a request for a reward to be given to a another person associated with the military, processing by the remote server, the reward to be given to the another person associated with the military, and transmitting by the remote server, the reward to be given to the person associated with the military.

Determining the value of the reward preferably further comprises basing the value of the reward on a number of tickets purchased. Determining the value of the reward preferably further comprises basing the value of the reward on a ratio of a number of tickets purchased. Determining if the identification of the consumer preferably further comprises transmitting the identification of the consumer to a remote database, confirming the identification of the consumer by the remote database, and transmitting the confirmation of the identification of the consumer to the remote server.

The method preferably further comprises receiving the identification of the consumer by the remote server from a gate staff computing device, transferring the received identification to a database, confirming the identification of the consumer by the remote database, transmitting the confirmation of the identification of the consumer to the remote server, and transmitting the confirmation of the identification of the consumer to the gate staff computing device. The consumer computing device preferably interacts with the remote server using a software application. The method preferably further comprises providing a website by the remote server.

In a second aspect, a machine readable non-transitory medium storing executable program instructions which when executed cause a data processing system to perform a method is disclosed. The method comprises receiving by a remote server, a request for a ticket and an identification of a consumer sent via a consumer computing device, processing the request for ticket to generate an electronic ticket, determining if the identification of the consumer matches the criteria for offering a reward by the remote server, determining the value of the reward, and transmitting by the remote server to the consumer computing device, the electronic ticket and reward.

In a second preferred embodiment, the method further comprises determining whether the identification of the consumer indicates that the consumer is associated with the military, and generating a reward for the consumer associated with the military. The method preferably further comprises determining whether the identification of the consumer indicates that the consumer is associated with one or more of the following: military members, veterans, police members, fire department members, or other public servants, and generating a reward for the consumer. The method preferably further comprises receiving by the remote server, a request for a reward to be given to a another person associated with the military, processing by the remote server, the reward to be given to the another person associated with the military, and transmitting by the remote server, the reward to be given to the person associated with the military.

Determining the value of the reward preferably further comprises basing the value of the reward on a number of tickets purchased. Determining the value of the reward preferably further comprises basing the value of the reward on a ratio of a number of tickets purchased. Determining if the identification of the consumer preferably further comprises transmitting the identification of the consumer to a remote database, confirming the identification of the consumer by the remote database, and transmitting the confirmation of the identification of the consumer to the remote server.

The method preferably further comprises receiving the identification of the consumer by the remote server from a gate staff computing device, transferring the received identification to a database, confirming the identification of the consumer by the remote database, transmitting the confirmation of the identification of the consumer to the remote server, and transmitting the confirmation of the identification of the consumer to the gate staff computing device. The consumer computing device preferably interacts with the remote server using a software application. The method preferably further comprises providing a website by the remote server.

In a third aspect, a system for generating rewards with ticket sales is disclosed. The system comprises at least one network for communicating among digital devices and a consumer computing device operable to perform the operations of receiving input from a user, the input comprising a request for a ticket and an identification of a consumer, and transmitting the request for a ticket and an identification of a consumer via the network.

The system further comprises a vendor server having a server controller, the vendor server coupled to the network and operable to perform the operations of receiving the request for a ticket and an identification of a consumer sent via the consumer computing device, processing the request for ticket to generate an electronic ticket, transmitting via the network, the identification of the consumer matches the criteria for offering a reward by the remote server, receiving via the network confirmation of the identification of the consumer, determining the value of the reward, and transmitting by the remote server to the consumer computing device, the electronic ticket and reward.

The system further comprises a database having a database controller, the database coupled to the network and operable to perform the operations of receiving the identification of the consumer from the vendor server, confirming the identification of the consumer, and transmitting the confirmation of the identification of the consumer to the vendor server.

The system further comprises a gate staff computing device, the gate staff computing device coupled to the net receiving identification of the consumer by the remote server from a gate staff computing device, transferring the received identification to the database, and receiving the confirmation of the identification of the consumer to the gate staff computing device.

The present invention has other objects and features of advantage which will be more readily apparent from the following description of the preferred embodiments of carrying out the invention, when taken in conjunction with the accompanying drawings.

DETAILED DESCRIPTION OF THE PREFERRED EMBODIMENTS

Many special events may offer the consumers or attendees a reward or an opportunity to make a donation to a charity. For example, a concert may be held to honor or support active members of the military or veterans. The current process described herein provides for a process to automatically generate such rewards at the conclusion of each ticket sale and verify the identity of the special rewards recipients to ensure that only the correct recipients receive the special rewards.

Preferred embodiments of a system and process for automatically generating such rewards are described herein. In one aspect of one or more embodiment, a website featuring information about a special event and means to purchase tickets to attend the special event is provided. In yet another aspect, a mobile application for smart phones and tablets having the same functionality is provided. As examples only and not as limitations, the special events may comprise music concerts, live performances, live concerts for military veterans and the like. Special promotional offers and rewards at the event are provided on the website or the mobile application.

To purchase the tickets, the event attendee/purchaser selects a portal on a system, such as the website or the mobile application that provides the means to place the purchase order for the tickets. According to one embodiment, the system directs the purchaser to portal where the attendee can place an order for the number of tickets desired, input the method of payment and billing address, such as a credit card or a debit card, and select a method of how the tickets will be delivered. After the payment is confirmed, at the conclusion of the purchase, the rewards associated with the purchase of the tickets are automatically generated. In a preferred embodiment, the rewards generated may correspond to the number of tickets purchased in a one to one ratio. Thus, for each ticket purchased, a reward is automatically generated. If there are two tickets purchased, then two rewards are automatically generated. In other alternative embodiments, other rewards to purchased tickets ratios may be used, such as one to two, one to three and so forth. For example, in a one to two ratio, for each ticket purchased, two rewards may be automatically generated. Without limitations, the rewards may be in the form of free tickets to the special events, special donations to the purchaser's charity of choice and the like.

According to an alternative embodiment, the system may further provide a means to confirm a reward recipient's identity and qualification to receive the special rewards at the event. For instance, if the recipient of the reward is known, the purchaser may enter certain information into the system. The system will then extracts the data, sends the data to a third-party database to confirm the identity and qualification of the reward recipient, and receives a confirmation of the identity and qualification of the reward recipient from the third-party database. The identity and qualification of the reward recipient is then provided on the reward item. For illustration purposes only and not as a limitation, a website featuring information and means to purchase tickets to a live performance concert for military veterans may include a portal whereby an attendee can order tickets, provide credit card information and billing address for payment, and select a method of delivery for the tickets. In one embodiment, the tickets may be delivered via email and the purchaser may either print the tickets at home or show the email containing the electronic copy of the tickets on the purchaser's smart phone at the venue. In another embodiment, the tickets may be picked up at a roll call window at the venue. In yet another embodiment, the tickets may be purchased and stored using a special mobile application for smart phones and tablets specifically designed for the special event.

Upon placing the order and confirming payment of the tickets, the system according to an embodiment automatically generates the rewards. According to a preferred embodiment, the rewards may comprise free tickets for military service members or veterans in a one to one ratio. Thus, for instance, for each ticket purchased by a civilian or a non-military member, one free ticket for a military member or veteran is automatically generated.

In a further embodiment, if the purchaser knows of the identity of the military member or veteran and wishes to give the reward that person, the purchaser may enter the name and personal identification of the military member or veteran, or alternatively enter the military identification number to confirm the identity and qualification of the recipient for the special reward. Upon receiving the personal identification or military identification number, the system would then extract and process the identification, sends the data to a software that checks the personal identification or military identification number against the government database and sends back data to the system confirming the identity of the military member.

Upon completion of the purchase order, the purchaser may select a method of redeeming the purchased tickets, either by email delivery of the tickets whereby the event attendee can print the tickets at home, by picking up the tickets at the roll call window at the venue where the special event is held, or by storing the electronic copy of the tickets in the mobile application.

In the embodiment where the purchaser knows of the identity of the reward recipient and specifically designates the free ticket for a military member or veteran, the identity of the military member or veteran is confirmed on the ticket. In one embodiment, the confirmation of the identity of the military member on the ticket may be in the form of a scannable bar code. In the case where the tickets delivered include a mixture of tickets for both military members and non-military members (such as family members and friends of the military members), the process will allow the identification, selection and confirmation of the correct recipients of the special rewards on the tickets of the military members.

In other embodiments, the tickets to the special event may be purchased either through a ticketing agency or at the venue. When the tickets are purchased through a ticketing agency or directly at the venue, the automated system for generating a reward with every purchase of a ticket, as well as providing a means to enter a known recipient's identity and qualification to receive the reward and a means to confirm the identity of the special reward recipient on the tickets is provided in the same manner as described above.

Upon arriving at the venue where the special event is held, the rewards recipient will present the ticket to the gate staff. The gate staff will verify the identity of the special rewards recipient either by an electronic handheld device that scans the special code on the ticket or by manual entry of the information on the keypad of the electronic handheld device. The inputted data is then transmitted to a third-party server that confirms the identity of the rewards recipient and sends the confirmation back to the handheld device. The gate staff will then request the personal identification of the rewards recipient to confirm the identity of the recipient and provide the rewards to the recipient if the information on the personal identification matches the information on the electronic handheld device.

Alternatively, without the electronic handheld device, the gate staff may also request a form of personal identification from the rewards recipient and compare it with the information on the ticket. If the information on the personal identification matches the information on the ticket, the rewards recipient may redeem the special rewards at the event. Following the example of the live performance concert for military veterans above, upon arriving at the venue, the event attendees will present the entrance tickets to the gate staff. The gate staff will then scan the special codes on the tickets or manually enter the information using an electronic handheld device. The inputted data is then transmitted to a third-party server that confirms the identity of the military members or veterans who are entitled to free entry to the special event and sends the confirmation back to the handheld device. The gate staff will request personal identifications of the military member or veterans, and upon confirming that the information on the personal identifications match the information on the handheld device, the gate staff will allow the military members or veterans to enter the concert venue free of charge. Alternatively, without the electronic handheld device, the gate staff may also request a form of personal identification from the military members, such as a driver's license or a military card, and compare it with the information on the ticket. If the information on the personal identification matches the information on the ticket, the military members may enter the live performance concert free of charge.

Without limitations and for examples only, the system and process described herein may be used to reward military members, veterans, police members, fire department members and other public servants every time a civilian purchases a ticket for a special event. In the example of a live concert for military veterans above, in the embodiment of a one to one rewards to purchased tickets ratio, if there were 30,000 tickets purchased by civilians, up to 30,000 military members or veterans may receive the free tickets to enter the special event, totaling 60,000 people in attendance.

In an aspect, a process for providing a reward with a purchase of a ticket to a special event is disclosed. The process comprising the steps of providing a means to place an order for a number of tickets desired, inputting a method of payment, selecting a method of ticket delivery, and providing a system to automatically generate the reward for each ticket purchased.

In a preferred embodiment, the means to place an order for a number of tickets desired, input a method of payment, and select a method of ticket delivery further comprises providing a website for the special event. The means to place an order for a number of tickets desired, input a method of payment, and select a method of ticket delivery preferably further comprises providing a mobile application specifically designed for the special event. The process preferably further comprising a means to confirm a reward recipient's identity and qualification to receive the reward.

In another aspect, a process for providing a public servant one free ticket to a special event is disclosed. The process comprising the steps of providing a means for a civilian to place an order for one ticket to the special event at full price, input a method of payment, and select a method of ticket delivery; and providing a system to automatically generate the free ticket to the special event each time the civilian purchases the ticket to the special event at full price.

In a preferred embodiment, the public servant may comprise a police officer, a military member or a veteran. The means for a civilian to place an order for one ticket to the special event at full price, input a method of payment, and select a method of ticket delivery preferably further comprises providing a website for the special event. The means for a civilian to place an order for one ticket to the special event at full price, input a method of payment, and select a method of ticket delivery preferably further comprises providing a mobile application specifically designed for the special event.

The process preferably further comprises a means to confirm the public servant's identity and qualification to receive the free ticket.

Figure 1:
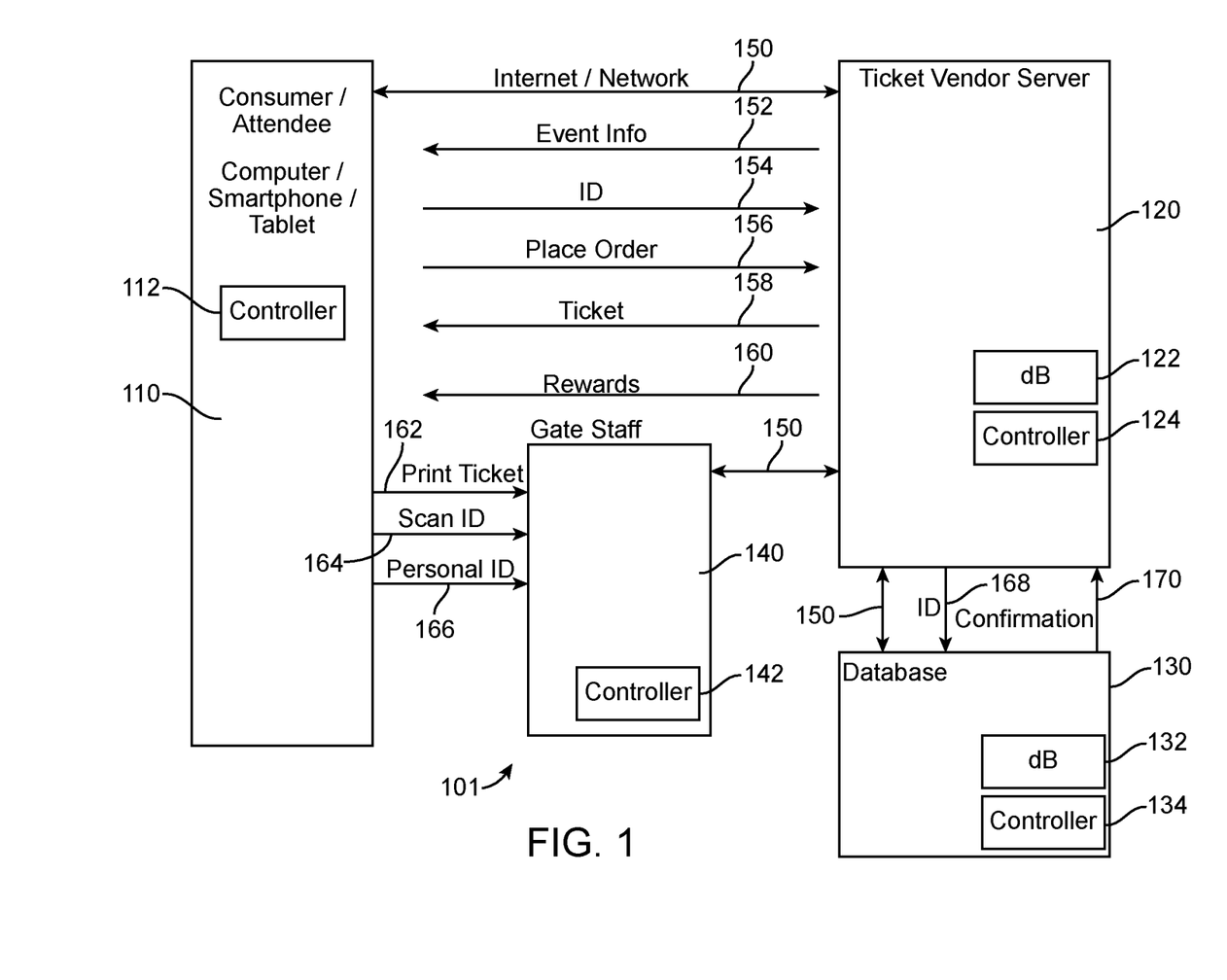
FIG. 1 is a schematic block diagram of a system for automatically generating rewards when purchasing tickets in one or more embodiments.

FIG. 1 is a schematic block diagram of a system 101 for automatically generating rewards with ticket sales in one or more embodiments. The system 101 comprises one or more of the following: a consumer/attendee computing device 110, a remote ticket vendor server 120, a database 130, and a gate staff computing device 140. The database 130 may be associated with the government to confirm military status of a consumer/attendee, or may be associated with a private company in one or more embodiments. The system 101 further comprises one or more networks 150 such as the Internet.

The consumer/attendee computing device 110 has a controller 112 and may be in the form of a desktop computer, a laptop computer, a smartphone, or a tablet in one or more embodiments. The ticket vendor server 120 comprises a database or memory 122 and a controller 124. The database 130 comprises a database 132 and a database controller 134. The gate staff computing device 140 has a gate staff controller 142 and may be in the form of a computer, handheld scanner, or other smart device.

FIG. 1 also illustrates the communication and interaction among the devices in the system 101. Event Information 152 may be transferred from the vendor server 120 to the consumer/attendee computing device 110 through such means as the vendor server 120 providing a website or directing a consumer/attendee to a portal for example.

The consumer/attendee interacts with the consumer/attendee computing device 110 via a touchscreen or keypad in one or more embodiments. The consumer/attendee may enter into the consumer/attendee computing device 110 information such as a request for one or more tickets, identification of the consumer/attendee, contact information, and credit card information in one or more embodiments.

The consumer/attendee computing device 110 processes the information entered by the consumer/attendee and electronically transmits the request for a ticket 156 (i.e., "Place Order") and an identification of a consumer 154 via the network 150. In an embodiment, the consumer computing device 110 interacts with the remote vendor server 120 using a software application or through a website.

The vendor server 120 is coupled to the network 150 and operable to perform the operations of receiving the request for a ticket 156 and an identification 154 of a consumer sent via the consumer/attendee computing device 110.

The vendor server 120 process the request for tickets either internally employing the vendor server database 122 and controller 124 or by interacting with third-party databases such as database 130. In an embodiment, the vendor server 120 processes the request for ticket 156 to generate an electronic ticket 158 employing the vendor server database 122 and vendor server controller 124. The vendor server 120 may determine if the identification 154 of the consumer matches the criteria for offering a reward, as well as determine the value of the reward, which then transmits the electronic ticket 158 and reward 160 to the consumer/attendee computing device 110. As discussed herein, the criteria for obtaining a reward may be based on the consumer/attendee being a member of the military, police department, fire department, or rescue teams for example. The value of the reward may be based on the number of tickets purchased or a ratio of the number of tickets purchased for example.

In another embodiment, the vendor server 120 may transmit via the network 150 the identification of the consumer/attendee 168 to an external, third-party database 130. The database 130 employs an internal database 132 which can be used to confirm the identification of the consumer/attendee 168. The database 130 sends a confirmation 170 of the identification of the consumer 154 back to the vendor server 120. The vendor server 120 determines the value of the reward, and transmits via the network 150 to the consumer/attendee computing device 110, the electronic ticket 158 and reward 160.

In an embodiment, the vendor server 120 may have a machine readable non-transitory medium storing executable program instructions stored in the memory or database 122 which when executed cause a data processing system to perform a method comprising receiving by a remote vendor server 120, a request for a ticket 156 and an identification of a consumer 154 sent via a consumer computing device 110, processing the request for ticket 156 to generate an electronic ticket 158, determining if the identification of the consumer 154 matches the criteria for offering a reward by the remote vendor server 120, determining the value of the reward, and transmitting by the remote server 120 to the consumer computing device 110, the electronic ticket and reward.

As discussed above, the database 130 is coupled to the network 150 and is operable to perform the operations of receiving the identification 168 of the consumer from the vendor server 120, confirming the identification of the consumer, and then transmitting the confirmation of the identification 170 of the consumer to the vendor server 120.

The gate staff computing device 140 is coupled to the network 150 and receives identification of the consumer such as though receiving a printed ticket 162 or scanning identification 164, or reviewing personal identification 166. The gate staff computing device 140 may be coupled to the network 150 for communication with the vendor server 120.

In one or more embodiments, the devices described herein such as the consumer/attendee computing device 110 as well as other devices may employ communications capability like cellular, Wi-Fi, Bluetooth for example. In an embodiment, RFID and Geo Tracking, GPS or other tracking for the device description may be employed. This feature may be important as event officials will know who, what when and where a person wearing the device bought or was a recipient of a free ticket, beer, merchandise and eliminates other claims by way of claiming channels of communications.

Figure 2:
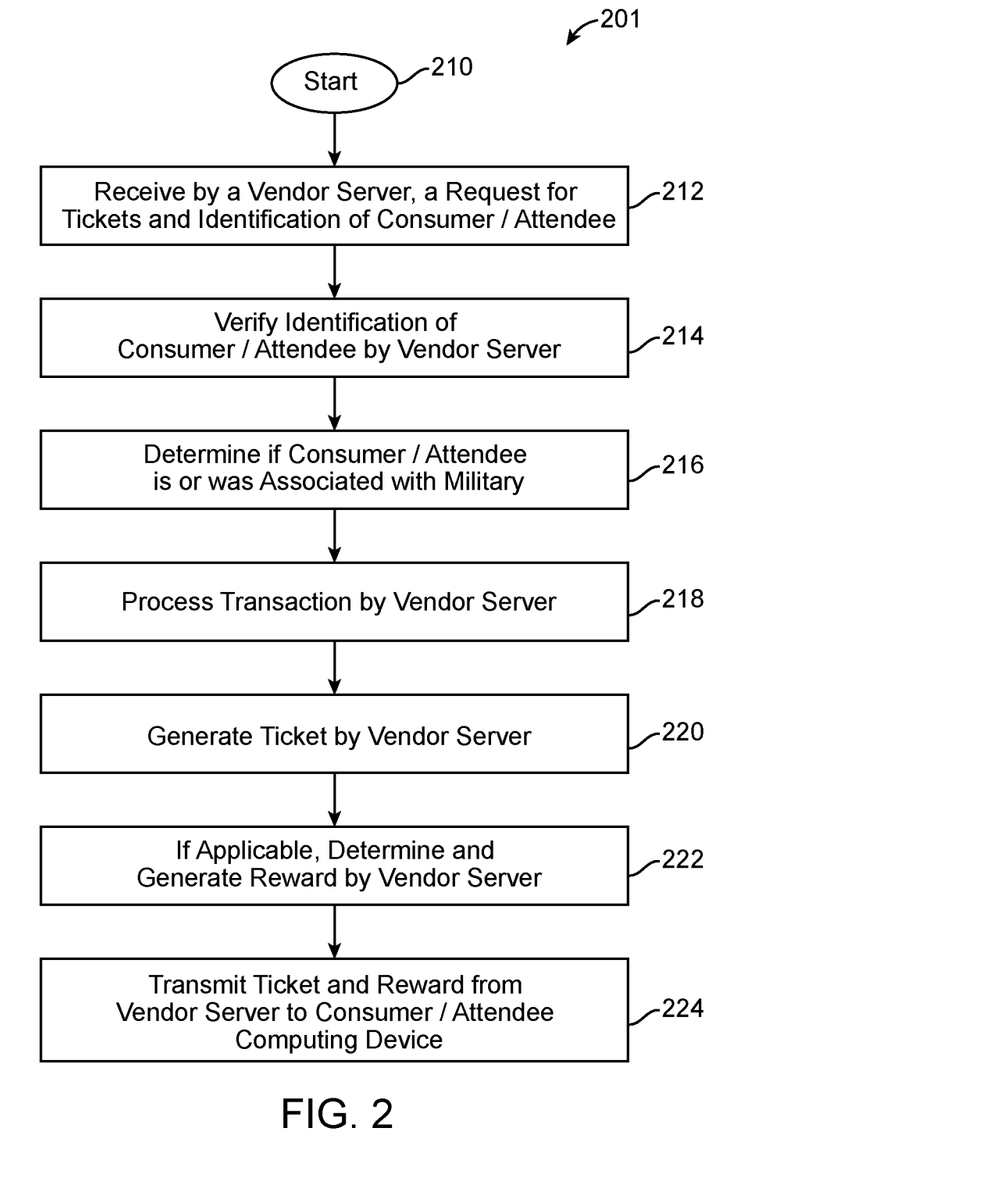
FIG. 2 is an exemplary flowchart of a method determining and generating a consumer/attendee reward.

FIG. 2 is an exemplary flowchart of a method 201 for determining and generating a consumer reward. After the start (step 210), the vendor server 120 receives a request for tickets 156 and an identification of the consumer/attendee 154 (step 212). The vendor server 120 verifies the identification of the consumer/attendee 154, either internally within the vendor server 120 or via a database 130 as discussed above (step 214).

The vendor server 120 determines if the consumer/attendee is or was associated with military (step 216). In an embodiment, vendor server 120 determines whether the identification of the consumer indicates that the consumer is associated with one or more of the following: military members, veterans, police members, fire department members, or other public servants, and then generates the appropriate reward for the consumer.

In an embodiment, the vendor server 120 receives a request for a reward to be given to another person associated with the military, processes the reward to be given to the another person associated with the military, and transmits by the remote vendor server 120, the reward to be given to the another person associated with the military.

The transaction is processed by the vendor server 120 (step 218). The vendor server 120 generates a ticket 158 (step 220). If applicable, the vendor server 120 determines and generates a reward (step 222). The step of determining the value of the reward may be based the value of the reward on a number of tickets purchased, or may be based on the value of the reward on a ratio of a number of tickets purchased. The vendor server 120 then transmits the ticket 158 and reward 160 to the consumer/attendee computing device 110 (step 224).

Figure 3:
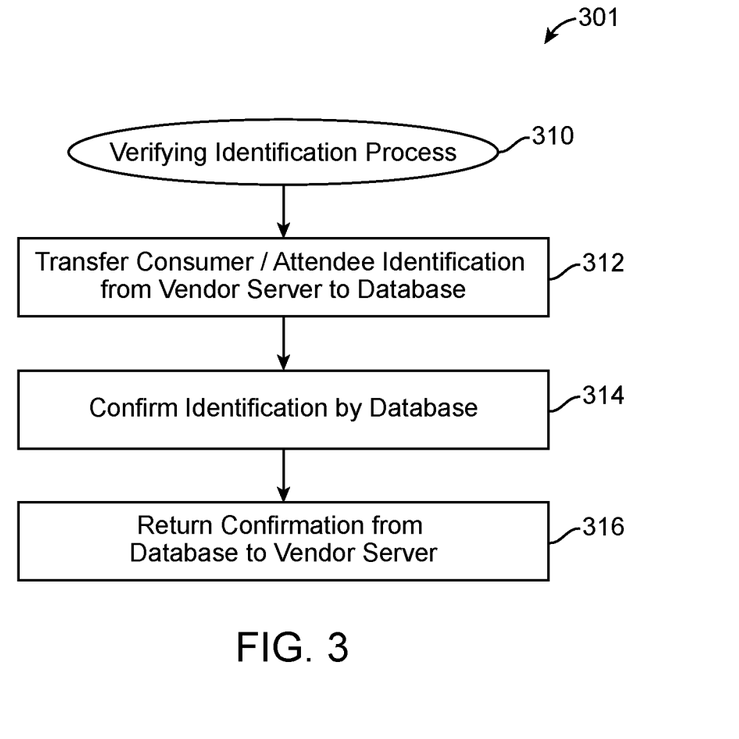
FIG. 3 is an exemplary flowchart of a method for a database to confirm identification of a consumer/attendee.

FIG. 3 is an exemplary flowchart of a method 301 for a database 130 to confirm identification of a consumer/attendee. The process of verifying identification starts (step 310) by transferring the consumer/attendee identification 168 from the vendor server 120 to the database 130 (step 312). The database 130 confirms Identification of the consumer/attendee (step 314). The database 130 returns confirmation 170 from the database 130 to the vendor server 120 (step 316).

Figure 4:
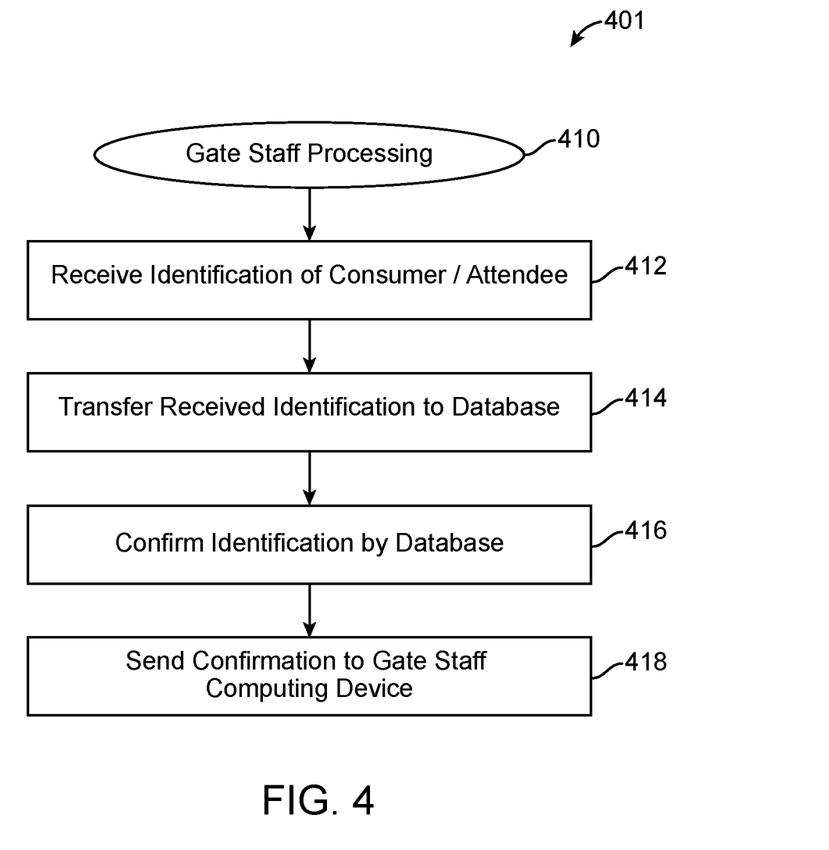
FIG. 4 is an exemplary flowchart of a method for a gate staff computing device interacting with a remove database.

FIG. 4 is an exemplary flowchart of a method 401 for a gate staff computing device 140 interacting with a remote database either within the vendor server 120 or the database 130. The processing of the gate staff computing device 140 starts (step 410) by receiving identification of the consumer/attendee (step 412). The gate staff computing device 140 transfers the received Identification to database 130 or vendor server 20 (step 414). The database 130 or the vendor server 120 confirms the consumer/attendee (step 416). The gate staff computing device 140 receives the confirmation (step 418).

Unless specifically stated otherwise, it shall be understood that disclosure employing the terms "processing," "computing," "determining," "receiving," "transmitting," and others refer to a data processing system or other electronic device manipulating or transforming data within the device memories or controllers into other data within the system memories or registers.

One or more embodiments may be implemented in computer software firmware, hardware, digital electronic circuitry, and computer program products which may be one or more modules of computer instructions encoded on a computer readable medium for execution by or to control the operation of a data processing system. The computer readable medium may be a machine readable storage substrate, flash memory, hybrid types of memory, a memory device, a machine readable storage device, random access memory ("RAM"), read-only memory ("ROM"), a magnetic medium such as a hard-drive or floppy disk, an optical medium such as a CD-ROM or a DVR, or in combination for example. A computer readable medium may reside in or within a single computer program product such as a CD, a hard-drive, or computer system, or may reside within different computer program products within a system or network. The computer readable medium can store software programs that are executable by the processor and may include operating systems, applications, and related program code. The machine readable non-transitory medium storing executable program instructions which, when executed, will cause a data processing system to perform the methods described herein. When applicable, the ordering of the various steps described herein may be changed, combined into composite steps, or separated into sub-steps to provide the features described herein.

Computer programs such as a program, software, software application, code, or script may be written in any computer programming language including conventional technologies, object oriented technologies, interpreted or compiled languages, and can be a module, component, or function. Computer programs may be executed in one or more processors or computer systems.

Although the invention has been discussed with reference to specific embodiments, it is apparent and should be understood that the concept can be otherwise embodied to achieve the advantages discussed. The preferred embodiments above have been described primarily as systems and methods for automatically generating rewards with ticket sales. In this regard, the foregoing description of the systems and methods is presented for purposes of illustration and description. It shall be understood that other combinations of computing device are contemplated in one or more embodiments.

Furthermore, the description is not intended to limit the invention to the form disclosed herein. Accordingly, variants and modifications consistent with the following teachings, skill, and knowledge of the relevant art, are within the scope of the present invention. The embodiments described herein are further intended to explain modes known for practicing the invention disclosed herewith and to enable others skilled in the art to utilize the invention in equivalent, or alternative embodiments and with various modifications considered necessary by the particular application(s) or use(s) of the present invention.

What is claimed is:

1. A machine implemented method for generating rewards with ticket sales, the method comprising:

receiving, by a remote server and sent via a consumer computing device, a request to purchase a number of tickets for an event and identification information corresponding to a desired reward recipient;

transmitting, by the remote server, the received identification information to a remote database;

confirming that the desired reward recipient is qualified to receive a reward, the confirming comprising verifying that the desired reward recipient is one or more of i) a military member, ii) a military veteran, iii) a police member, iv) a fire department member, or v) a public servant, by matching the identification information against information stored within the remote database; and receiving, by the remote server, the confirmation that the desired reward recipient is qualified to receive a reward;

tracking a location of the consumer computing device;

recording the location of the consumer computing device to monitor the activities of a consumer;

processing, by the remote server, the request to purchase the number of tickets by at least confirming payment for the number of tickets;

responsive to processing the request, determining a number of free tickets to the event based on a ratio of number of free tickets per number of purchased tickets;

generating, by the remote server, one or more electronic tickets corresponding to the purchased number of tickets to the event;

generating, by the remote server and based at least in part on the received confirmation, one or more rewarded tickets corresponding to the determined number of free tickets to the event, wherein the one or more rewarded tickets each comprise an indication of the confirmation of the identification information corresponding to the desired reward recipient;

transmitting, by the remote server, the generated one or more rewarded tickets for delivery to said desired reward recipient;

transmitting, by the remote server, the generated on or more electronic tickets to the consumer computing device; and transmitting, by the remote server, the confirmation that the desired reward recipient is qualified to receive the reward to a gate staff computing device.

2. The machine implemented method for generating rewards with ticket sales of claim 1, wherein the identification information corresponding to the desired reward recipient comprises a military identification number, and wherein the verifying comprises matching the military identification number against a government database to confirm the desired reward recipient is one or more of i) a military member or ii) a military veteran.

3. The machine implemented method for generating rewards with ticket sales of claim 1, the method further comprising:
receiving, by the remote server from the gate staff computing device, the identification information corresponding to a desired reward recipient;
transferring, by the remote server, the received identification information to a database;
confirming the identification information corresponding to a desired reward recipient by the database,
transmitting the confirmation of the identification information corresponding to a desired reward recipient to the remote server; and
transmitting, by the remote server, the confirmation of the identification information corresponding to a desired reward recipient to the gate staff computing device.

4. The machine implemented method for generating rewards with ticket sales of claim 1, wherein the consumer computing device interacts with the remote server using a software application.

5. The machine implemented method for generating rewards with ticket sales of claim 1, the method further comprising:
providing a website by the remote server.

6. A machine readable non-transitory medium storing executable program instructions which when executed cause a data processing system to perform a method comprising:
receiving, by a remote server and sent via consumer computing device, a request to purchase a number of tickets for an event and identification information corresponding to a desired reward recipient;
transmitting, by the remote server, the received identification information to a remote database;
confirming that the desired reward recipient is qualified to receive a reward, the confirming comprising verifying that the desired reward recipient is one or more of i) a military member, ii) a military veteran, iii) a police member, iv) a fire department member, or v) a public servant, by matching the identification information against information stored within the remote database; and
receiving, by the remote server, the confirmation that the desired reward recipient is qualified to receive a reward;
tracking a location of the consumer computing device;
recording the location of the consumer computing device to monitor the activities of a consumer;
processing, by the remote server, the request to purchase the number of tickets by at least confirming a payment for the number of tickets;
responsive to processing the request, determining a number of free tickets to the even based on a ratio of number of free tickets per number of purchased tickets;
generating, by the remote server, one or more electronic tickets corresponding to the purchased number of tickets to the event;
generating, by the remote server and based at least in part on the received confirmation, one or more rewarded tickets corresponding to the determined number of free tickets to the event, wherein the one or more rewarded tickets each comprise an indication of the confirmation of the identification information corresponding to the desired reward recipient;
transmitting, by the remote server, the generated one or more rewarded tickets for delivery to said desired reward recipient;
transmitting, by the remote server, the generated one or more electronic tickets to the consumer computing device; and
transmitting, by the remote server, the confirmation that the desired reward recipient is qualified to receive the reward to a gate staff computing device.

7. The machine readable non-transitory medium storing executable program instructions which when executed cause the data processing system to perform the method of claim 6, wherein the identification information corresponding to the desired reward recipient comprises a military identification number, and wherein the verifying comprises matching the military identification number against a government database to confirm the desired reward recipient is one ore more of i) a military member or ii) a military veteran.

8. The machine readable non-transitory medium storing executable program instructions which when executed cause the data processing system to perform the method of claim 6, the method further comprising:
receiving, by the remote server from the gate staff computing device, the identification information corresponding to a desired reward recipient;
transferring, by the remote server, the received identification information to a database;
confirming the identification information corresponding to a desired reward recipient by the database;
transmitting, by the remote server, the confirmation of the identification information corresponding to a desired reward recipient to the gate staff computing device.

9. The machine readable non-transitory medium storing executable program instructions which when executed cause the data processing system to perform the method of claim 6, wherein the consumer computing device interacts with the remote server using a software application.

10. A system for generating rewards with ticket sales, the system comprising:
at least one network for communicating among digital devices;

a consumer computing device configured to perform the operations of:
  receiving input from a user, the input comprising a request a to purchase a number of tickets for an event and identification information corresponding to a desired reward recipient
  transmitting the request to purchase the number of tickets and the identification information corresponding to a desired reward recipient via the network;
a remote server having a server controller, the remote server coupled to the network and configured to perform the operations of:
  receiving the request to purchase the number of tickets and the identification information corresponding to a desired reward recipient sent via the consumer computing device;
  transmitting the received identification information corresponding to the desired reward recipient to a database;
  receiving confirmation that the desired reward recipient is qualified to receive a reward from the database;
  tracking a location of the consumer computing device;
  recording the location of the consumer computing device to monitor the activities of a consumer;
  processing the request to purchase the number of tickets by at least confirming payment for the number of tickets;
  responsive to processing the request determining a number of free tickets to the event based on a ratio of the number of free tickets per number of purchased tickets;
  generating one or more electronic tickets corresponding to the purchased number of tickets to the event;
  generating, based at least in part on the received confirmation, one or more rewarded tickets corresponding to the determined number of free tickets to the event, wherein the one or more rewarded tickets each comprise an indication of the confirmation of the identification information corresponding to the desired reward recipient;
  transmitting the generated one or more rewarded tickets for delivery to said desired reward recipient; and
  transmitting the generated one or more electronic tickets to the consumer computing device;
  transmitting the confirmation that the desired reward recipient is qualified to receive a reward to a gate staff computing device;
a database having a database controller, the database coupled to the network and configured to perform the operations of:
  receiving the identification information corresponding to the desired reward recipient from the remote server;
  confirming that the desired reward recipient is qualified to receive a reward, the confirming comprising verifying that the desire reward recipient is one or more of i) a military member, ii) a military veteran, iii) a police member, iv) a fire department member, or v) a public servant, by matching the identification information against information stored within the remote database; and
  transmitting the confirmation that the desired reward recipient is qualified to receive a reward to the remote server, and
a gate staff computing device, the gate staff computer coupled to the network and operable to perform the operations of:
  receiving the identification information corresponding to a desired reward recipient;
  transferring the received identification information to the database;
  receiving, from the remote server, confirmation of the identification information.

* * * * *